(12) United States Patent
Herzog et al.

(10) Patent No.: US 12,142,761 B2
(45) Date of Patent: Nov. 12, 2024

(54) TRANSITION METAL OXIDE PARTICLES ENCAPSULATED IN NANOSTRUCTURED LITHIUM TITANATE OR LITHIUM ALUMINATE, AND THE USE THEREOF IN LITHIUM ION BATTERIES

(71) Applicant: Evonik Operations GmbH, Essen (DE)

(72) Inventors: Marcel Herzog, Karlstein (DE); Daniel Esken, Erlensee (DE); Ryo Takata, Hanau (DE); Franz Schmidt, Frankfurt (DE); Rajendra Negi, Giessen (DE); Matthias Elm, Giessen (DE)

(73) Assignee: Evonik Operations GmbH, Essen (DE)

( * ) Notice: Subject to any disclaimer, the term of this patent is extended or adjusted under 35 U.S.C. 154(b) by 174 days.

(21) Appl. No.: 17/454,070

(22) Filed: Nov. 9, 2021

(65) Prior Publication Data

US 2022/0149368 A1 May 12, 2022

(30) Foreign Application Priority Data

Nov. 11, 2020 (EP) .................................... 20206870

(51) Int. Cl.
*H01M 4/525* (2010.01)
*H01M 4/04* (2006.01)
(Continued)

(52) U.S. Cl.
CPC ......... *H01M 4/525* (2013.01); *H01M 4/0416* (2013.01); *H01M 4/505* (2013.01); *H01M 10/0525* (2013.01)

(58) Field of Classification Search
CPC .... H01M 4/525; H01M 4/0416; H01M 4/505; H01M 10/0525
See application file for complete search history.

(56) References Cited

U.S. PATENT DOCUMENTS

2009/0239148 A1\* 9/2009 Jiang ................... H01M 4/5815
429/231.95
2016/0064732 A1 3/2016 Copley
(Continued)

FOREIGN PATENT DOCUMENTS

CN 109004201 12/2018
CN 109830654 5/2019
(Continued)

OTHER PUBLICATIONS

Liu, W., Li, X., Xiong, D., Hao, Y., Li, J., Kou, H., Yan, B., Li, D., Lu, S., Koo, A. and Adair, K., Nano Energy 44 (2018): 111-120 (Year: 2018).\*
(Continued)

*Primary Examiner* — Milton I Cano
*Assistant Examiner* — Albert Michael Hilton
(74) *Attorney, Agent, or Firm* — Grüneberg and Myers PLLC

(57) ABSTRACT

A process for producing a coated transition metal oxide involves subjecting a transition metal oxide and a pyrogenically produced lithium titanate and/or pyrogenically produced lithium aluminate to dry mixing. A coated transition metal oxide is obtainable by this process; and cathode for a lithium ion battery and a lithium ion battery containing such coated particles is useful.

14 Claims, 8 Drawing Sheets

(51) Int. Cl.
    *H01M 4/505*     (2010.01)
    *H01M 10/0525*     (2010.01)

(56) References Cited

U.S. PATENT DOCUMENTS

| | | | | |
|---|---|---|---|---|
| 2017/0271655 A1* | 9/2017 | Oh | .................... | H01M 4/0471 |
| 2020/0010367 A1* | 1/2020 | Esken | .................. | H01M 4/505 |

FOREIGN PATENT DOCUMENTS

| | | | | |
|---|---|---|---|---|
| JP | 6431236 | | 11/2018 | |
| WO | 2018/149834 | | 8/2018 | |
| WO | WO-2018149834 A1 | * | 8/2018 | ............... C01F 7/02 |
| WO | 2021/037900 | | 3/2021 | |
| WO | 2021/037904 | | 3/2021 | |
| WO | 2021/048249 | | 3/2021 | |
| WO | 2021/048251 | | 3/2021 | |
| WO | 2021/089886 | | 5/2021 | |
| WO | 2021/144299 | | 7/2021 | |

OTHER PUBLICATIONS

Jiménez-Becerril, J., and I. García-Sosa. Journal of Ceramic Processing Research 12, No. 1 (2011): 52-56 (Year: 2011).*
Nakamura, H., Kawaguchi, T., Masuyama, T., Sakuda, A., Saito, T., Kuratani, K., Ohsaki, S. and Watano, Journal of Power Sources 448 (2020): 227579 (Year: 2020).*
Wang, Y.Y., Sun, Y.Y., Liu, S., Li, G.R. and Gao, X.P, ACS Applied Energy Materials 1, No. 8 (2018): 3881-3889 (Year: 2018).*
Liu, Wen, et al. "Significantly improving cycling performance of cathodes in lithium ion batteries: the effect of Al2O3 and LiAlO2 coatings on LiNi0. 6Co0. 2Mn0. 2O2." Nano Energy 44 (2018): 111-120. (Year: 2018).*
Karhunen, Tommi, et al. "Transition metal-doped lithium titanium oxide nanoparticles made using flame spray pyrolysis." International Scholarly Research Notices 2011 (2011). (Year: 2011).*
Bian, Xiaolei, et al. "Effect of lifters and mill speed on particle behaviour, torque, and power consumption of a tumbling ball mill: Experimental study and DEM simulation." Minerals Engineering 105 (2017): 22-35. (Year: 2017).*
Kang, Yun Chan, Seung Bin Park, and Sang Woon Kwon. "Preparation of submicron size gamma lithium aluminate particles from the mixture of alumina sol and lithium salt by ultrasonic spray pyrolysis." Journal of colloid and interface science 182.1 (1996): 59-62. (Year: 1996).*
Tamadondar, Mohammad R., et al. "The influence of particle interfacial energies and mixing energy on the mixture quality of the dry-coating process." Powder Technology 338 (2018): 313-324 (Year: 2018).*
Widmaier, M., Pfeifer, K., Bommer, L., & Presser, V. (2018). Valence-Tuned Lithium Titanate Nanopowder for High-Rate Electrochemical Energy Storage. Batteries & Supercaps, 1(1), 11-26. (Year: 2018).*
Cao et al., "$LiAlO_2$-coated $LiCoO_2$ as cathode material for lithium ion batteries", Solid State Ionics, vol. 176, 2005, pp. 911-914.
Cheng et al., "Enhanced electrochemical performances of 5 V spinel $LiMn_{1.58}Ni_{0.42}O_4$ cathode materials by coating with $LiAlO_2$", Journal of Power Sources, vol. 239, 2013, pp. 181-188.
Ernst et al., "Electrochemically active flame-made nanosized spinels: $LiMn_2O_4$, $Li_4Ti_5O_{12}$ and $LiFe_5O_8$", Materials Chemistry and Physics, vol. 101, 2007, XP005737781, pp. 372-378.
Extended European Search Report issued Apr. 6, 2021 in European Patent Application No. 20206870.6, 10 pages.
Fey et al., "Improved electrochemical performance of $LiCoO_2$ surface treated with $Li_4Ti_5O_{12}$", Journal of Power Sources, vol. 174, 2007, pp. 1147-1151.
Gockeln et al., "Flame aerosol deposited $Li_4Ti_5O_{12}$ layers for flexible, thin film all-solid-state Li-ion batteries", Nano Energy, vol. 49, 2018, pp. 564-573.
Ko et al., "Preparation and Electrochemical Properties of Nanometer-Sized $Li_2TiO_3$—$LiCrO_2$ Nanocomposite Cathode Powders by Spray Pyrolysis", International Journal of Electrochemical Science, vol. 8, 2013, pp. 2504-2514.
Malvern Instruments Worldwide, "A Basic Guide to Particle Characterization", May 2, 2012, XP055089322, 26 pages.
U.S. Appl. No. 16/486,589, filed Aug. 16, 2019, 2020/0010367, Esken et al.
U.S. Appl. No. 17/608,557, filed Nov. 3, 2021, Huang et al.

* cited by examiner

TRANSITION METAL OXIDE PARTICLES ENCAPSULATED IN NANOSTRUCTURED LITHIUM TITANATE OR LITHIUM ALUMINATE, AND THE USE THEREOF IN LITHIUM ION BATTERIES

CROSS-REFERENCE TO RELATED APPLICATIONS

This application claims priority to European Patent Application No. 20206870.6, filed on Nov. 11, 2020, the content of which is hereby incorporated by reference in its entirety.

BACKGROUND OF THE INVENTION

Field of the Invention

The invention relates to a process for producing transition metal oxide coated with pyrogenically produced lithium titanate and/or pyrogenically produced lithium aluminate, coated transition metal oxide obtainable by this process, cathode for a lithium ion battery and lithium ion battery comprising such coated metal oxide.

Description of Related Art

Various energy storage technologies have recently attracted much attention of public and have been a subject of intensive research and development at the industry and in the academia. As energy storage technologies are extended to devices such as cellular phones, camcorders and notebook PCs, and further to electric vehicles, demand for high energy density batteries used as a source of power supply of such devices is increasing. Secondary lithium batteries are one of the most important battery types currently used.

The secondary lithium batteries are usually composed of an anode made of a carbon material or a lithium-metal alloy, a cathode made of a lithium-transition metal oxide, and an electrolyte in which a lithium salt is dissolved in an organic solvent. The separator of the lithium battery provides the passage of lithium ions between the positive and the negative electrode during the charging and the discharging processes.

One of the general problems with cathode materials is their rapid aging and thus the loss of performance during cycling. This phenomenon is especially relevant for nickel manganese cobalt mixed oxides (NMC) with a high nickel content. The deactivation of the positive electrode material occurs by several electrochemical degradation mechanisms. Surface transformations such as the formation of a NiO-like phase due to the reduction of $Ni^{4+}$ in a highly delithiated state and oxygen loss as well as transition metal rearrangement destabilizes the crystal structure. This phase transitions have been associated with the initial cracks appearing at the cathode particle surface and subsequent particle disintegration. In addition, the electrolyte decomposes at the reactive surface of NMC and the electrolyte decomposition products deposit at the interface of cathode material, which leads to an increased resistance. Furthermore, the conducting salt $LiPF_6$, which is commonly used in liquid electrolytes reacts with the trace amounts of $H_2O$ present in all commercial formulations to form HF. This highly reactive compound causes lattice distortion in the cathode material by dissolution of transition metal ions out of the surface of the cathode material into the electrolyte. All these degradation mechanisms result in a decrease of capacity, performance and cycle life.

It is known that coating of transition metal oxide particles with some metal oxides can inhibit unwanted reactions of the electrolyte with the electrode materials and thus improve the long-life stability of the lithium batteries.

WO00/70694 A1 discloses mixed transition metal oxide particles coated with oxides or mixed oxides of Zr, Al, Zn, Y, Ce, Sn, Ca, Si, Sr, Mg and Ti. They are obtained by suspending the uncoated particles in an organic solvent, admixing the suspension with a solution of a hydrolysable metal compound and a hydrolysis solution, and then filtering off, drying and calcining the coated particles.

WO 2018149834A1 A1 discloses preparation of encapsulated mixed transition metal oxide particles by dry mixing of the metal oxides with a mixture of pyrogenically produced aluminium oxide and titanium dioxide.

Although positively affecting the long-term cycling stability of the electrodes, such metal oxide additives used for coating of the cathodes may deteriorate lithium ion diffusion, i.e. decrease the ionic conductivity of the electrode, leading to the lower initial currents.

Thus, coating the electrodes with particles both having protecting function and not decreasing the ionic conductivity of the electrodes in the first charging/discharging cycles would be desirable.

Two promising candidates of such conductive materials for protecting the electrodes are lithium titanate (LTO) and lithium aluminate (LAO).

CN109830654 A discloses lithium ion battery cathode comprising a cathode active material $LiNi_xMn_yCo_zO_2$ and a coating layer comprising at least one of MgO, $Al_2O_3$, $ZrO_2$, $TiO_2$, $AlPO_4$, $AlF_3$, $LiAlO_2$, $LiTiO_2$. The coating layer is reported to increase the specific surface area of the cathode active material and prevent the cathode metal ions from being dissolved in the charging process, so that the stability of the structure of the cathode active material is improved. No specific examples with $LiTiO_2$ are described.

Int. J. Electrochem. Sci. vol. 8 (2013), pp. 2504-2514 describes preparation of the nanometer-sized $Li_2TiO_3$—$LiCrO_2$ nanocomposite cathode powders by spray pyrolysis, thermal post-treatment and subsequent washing with water. The mean size of the thus obtained mixed nanocomposite powders post-treated at 750° C. was 130 nm. The initial charge and discharge capacities of the nanocomposite powders and the capacity retention thereof in the lithium ion batteries were tested. In this case, lithium titanate is a component, distributed throughout the whole cathode powder particles obtained.

Journal of Power Sources vol. 174 (2007), pp. 1147-1151 describes surface treatment of the $LiCoO_2$ cathode material with an ethanol dispersion of the $Li_4Ti_5O_{12}$ particles under sonication followed by drying and calcination at 723 K for 10 h in air. The thus obtained lithium titanate layer had an average thickness of 20 nm. These surface treated $LiCoO_2$ particles exhibited good cycle stability as cathodes in battery cells. Using the ethanol dispersion for coating LTO in this case makes necessary dealing with organic solvents and subsequent elimination thereof. Moreover, the shear forces in liquid media are usually too low for crushing the used agglomerated and aggregated particles and achieving good dispersibility thereof on the coated material.

M. Gockein et. al. report in Nano Energy, vol. 49 (2018), pp 564-573 the synthesis of lithium titanate particles via flame spray pyrolysis techniques followed by their direct deposition on a polyimide/copper foil and subsequent coating of the resulting composite foil on the surface of a lithium electrode.

CN 109004201 A1 discloses core-shell cathodes for polymer-based solid-state lithium ion batteries. The core structure of such cathodes can comprise lithium transition metal phosphates ($LiMn_xFe_{(1-x)}PO_4$, $LiCoPO_4$, $LiNiPO_4$), lithium manganate ($LiMnO_4$), lithium transition metal oxides ($LiNi_{0.5}Mn_{1.5}O_4$, $LiNi_xCo_yMn_zO_2$, $Li_2MnO_3$, $LiMO_2$ (M=Ni, Co, Mn)). The shell structure can comprise $Li_{1+x}Al_xTi_{2-x}(PO_4)_3$, $Li_{7-x}La_3Zr_{2-x}M_xO_{12}$ (M=Ta, Nb), $Li_xLa_{2/3-x}TiO_3$, $LiAlO_2$, $Li_2ZrO_3$, $Li_4Ti_5O_{12}$. The core-shell materials are prepared by mechanical stirring. Particle size of the used materials are rather large, e.g. 400 nm for $Li_xLa_{2/3-x}TiO_3$.

H. Cao et. al. report in Solid State Ionics, vol. 176 (2005), pp 911-914, preparation of $LiCoO_2$ coated with $LiAlO_2$ and $Al_2O_3$ by drying and calcining the aqueous mixture of $C_9H_{21}O_3Al$, LiOH and $LiCoO_2$ precursors. The electrochemical performance of the obtained material has also been tested.

In Journal of Power Sources, vol. 239 (2013), pp 181-188, synthesis of $LiAlO_2$-surface modified $LiMn_{1.58}Ni_{0.42}O_4$ spinel cathode materials is reported by coating $Al_2O_3$ on $Mn_{0.79}Ni_{0.21}CO_3$ precursors, followed by post-sintering with $Li_2CO_3$ at 900° C. The electrochemical performance of the obtained materials is also described.

The use of lithium titanates and lithium acuminate in lithium ion batteries, e.g. for coating of electrodes is known from the prior art. However, use of the available nano-sized lithium titanate or lithium acuminate particles often leads to inhomogeneous distribution and large agglomerated LTO and LAO particles on the surface of core cathode material and as a result, minimal or no improvements in cycling performance are observed when compared with non-coated cathode materials. LTOs and LAO with very small average particle sizes have not found broad application in batteries so far, A practical and economical process for coating of electrodes for lithium ion batteries with such particles has also not been reported so far in the prior art.

SUMMARY OF THE INVENTION

The problem addressed by the present invention is that of providing transition metal oxides modified with lithium-ion conductive additives improving the long-life stability of the lithium batteries in operation, as cathode materials for use in lithium ion batteries. The used ionic conductive additives should preferably be used in relatively small quantities as coating for all established types of transition metal oxide materials.

Another problem addressed by the invention is that of providing an efficient and economical process for achieving homogeneous distribution of the lithium-ion conductive additives with small average particle sizes and narrow particle size distributions on the surface of transition metal oxides. Metal oxide particles should be completely covered by the used coating additives. Larger non-dispersed agglomerates and aggregates of the coating particles on the metal oxide surface should be avoided.

The described modified transition metal oxide particles should be suitable for use as cathodes for lithium ion batteries, both with liquid and solid-state electrolytes.

In the course of thorough experimentation, it has been found that using a special type of coating process, the so-called dry coating, for mixing pyrogenically produced lithium titanate and/or pyrogenically produced lithium aluminate and transition metal oxide particles, lead to the unique coated materials which may be used as cathodes for the lithium ion batteries with increased performance.

The invention also includes the following embodiments:
1. Process for producing a coated transition metal oxide, characterized in that a transition metal oxide and a pyrogenically produced lithium titanate and/or a pyrogenically produced lithium aluminate are subjected to dry mixing.
2. Process according to embodiment 1, characterized in that dry mixing is carried out by means of an electric mixing unit having a specific electrical power of 0.05 kW-1.5 kW per kg of the transition metal oxide.
3. Process according to embodiments 1 to 2, characterized in that the BET surface area of the lithium titanate or lithium aluminate used for producing the coated transition metal oxide, is 10 $m^2/g$-200 $m^2/g$.
4. Process according to embodiments 1 to 3, characterized in that the mean particle diameter $d_{50}$ of particles of the lithium titanate used for producing the coated transition metal oxide, is 10 nm-200 nm, as determined by static light scattering (SLS) after 60 s of ultrasonic treatment at 25° C. of a 5% by weight dispersion of the particles in water.
5. Process according to embodiments 1 to 4, characterized in that the mean particle diameter $d_{50}$ of particles of the lithium aluminate used for producing the coated transition metal oxide, is less than 20 μm, as determined by static light scattering (SLS) after 60 s of ultrasonic treatment at 25° C. of a 5% by weight dispersion of the particles in water.
6. Process according to embodiments 1 to 5, further comprising thermal treatment of the coated transition metal oxide at a temperature 300° C.-1400° C.
7. Process according to embodiments 1 to 6, characterized in that the lithium aluminate is a compound of the formula $LiAlO_2$ and the lithium titanate is a compound of the formula $LiTiO_2$, $Li_2TiO_3$, $Li_2Ti_3O_7$, $Li_4TiO_4$, $Li_4Ti_5O_{12}$, or a mixture thereof.
8. Process according to embodiments 1 to 7, characterized in that the transition metal oxide is selected from the group consisting of cobalt oxides, manganese oxides, mixed nickel-cobalt oxides, mixed nickel-manganese-cobalt oxides, mixed nickel-cobalt-aluminium oxides, mixed nickel-manganese oxides, or a mixture thereof.
9. Process according to embodiments 1 to 8, characterized in that the proportion of the lithium titanate and/or lithium aluminate is 0.05%-5% by weight, related to the total weight of the used mixture of the transition metal oxide and the lithium titanate and/or lithium aluminate.
10. Coated transition metal oxide containing a core consisting of a transition metal oxide and a shell comprising pyrogenically produced lithium titanate with a number average particle size $d_{50}$ of 10 nm-200 nm, and/or pyrogenically produced lithium aluminate with a number average particle size $d_{50}$ of less than 20 μm as determined by TEM analysis.
11. Active positive electrode material for a lithium ion battery comprising the coated transition metal oxide according to embodiment 10.
12. Lithium ion battery comprising the coated transition metal oxide according to embodiment 10.
13. Lithium ion battery according to embodiment 12, containing a liquid, gel or polymer electrolyte,
14. Lithium ion battery according to embodiment 12, wherein the battery is of a solid-state type.

15. Use of the coated transition metal oxide according to embodiment 10 in a lithium ion battery.

DETAILED DESCRIPTION OF THE INVENTION

Figure 1A:
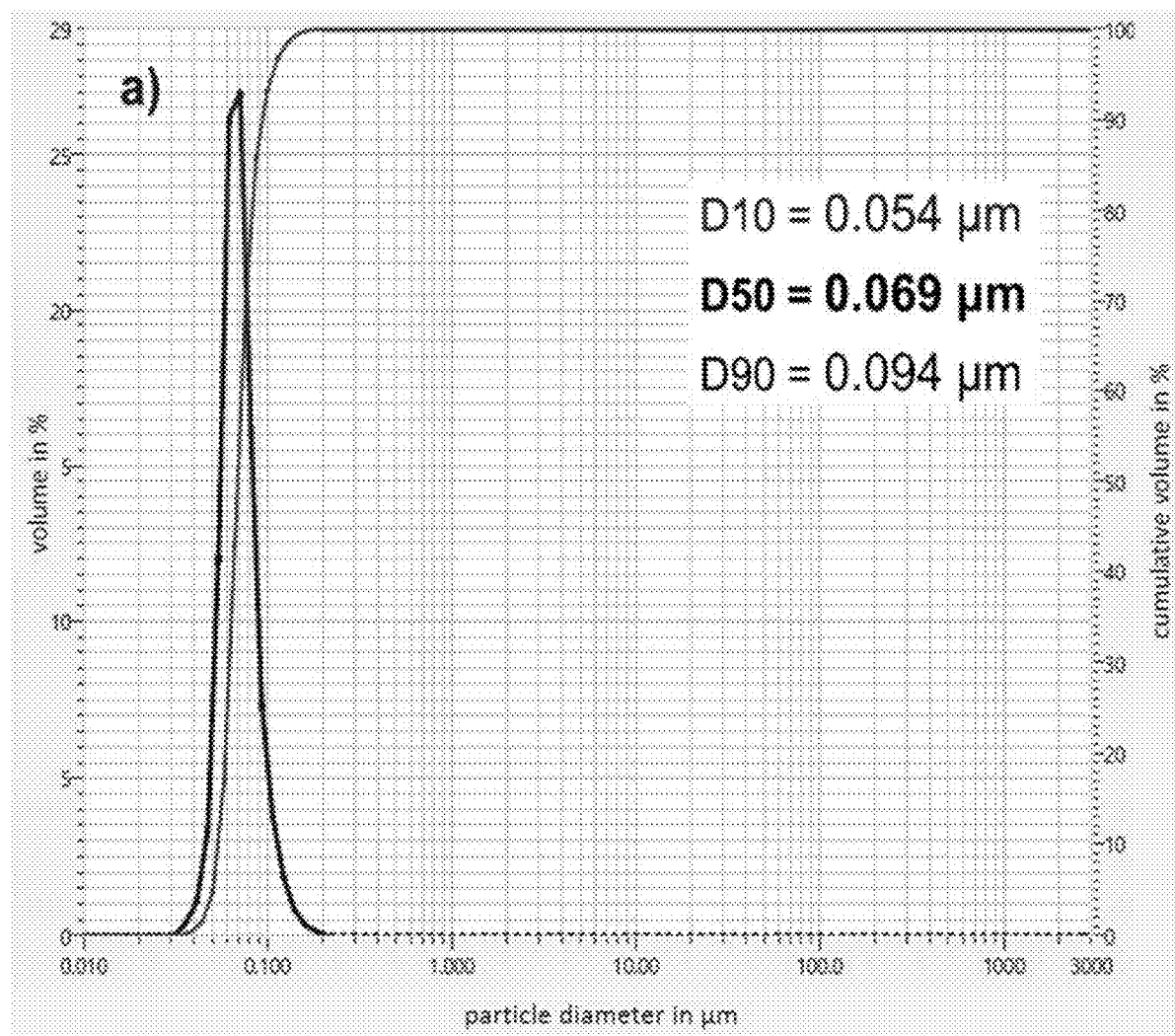
FIG. 1A shows the particle size distribution of fumed LTO, analyzed by a laser diffraction particle size analyzer.

Process for Producing of the Coated Transition Metal Oxide

The invention provides a process for producing a coated transition metal oxide, wherein a transition metal oxide and a pyrogenically produced lithium titanate and/or pyrogenically produced lithium aluminate are subjected to dry mixing.

In the context of the present invention, "dry mixing" relates to a mixing process where no liquid is added or used during the process, i.e. substantially dry powders are mixed together. However, it is possible that there are trace amounts of moisture or some other than water liquids present in the mixed feedstocks or that these include crystallization water.

Preferably, the mixture of the transition metal oxide and the pyrogenically produced lithium titanate and/or pyrogenically produced lithium aluminate contains less than 5% by weight, more preferably less than 3% by weight, more preferably less than 1% by weight water and/or other liquids.

Dry mixing process of the present invention has some benefits over a wet coating, e.g. coating with a dispersion containing lithium titanate and/or lithium aluminate. Such a wet coating process inevitably involves the use of solvents, which must be evaporated after the coating process is completed. Thus, the dry coating process of the invention is simpler and more economical than the wet coating processes known from the prior art. On the other hand, it has been surprisingly found that the dry coating process of the invention also provides a better distribution of the lithium titanate and/or lithium aluminate particles on the surface of the transition metal oxide.

In the inventive process, dry mixing is preferably carried out by means of an electric mixing unit having a specific electrical power of 0.05 kW-1.5 kW per kg of the transition metal oxide.

The term "electric mixing unit" relates in the context of the present invention to any mixing device operated by supply of electric energy.

Electrical power is the rate, per unit time, at which electrical energy is transferred by an electric circuit. The term "specific electrical power" relates in the context of the present invention to the electrical power, supplied by the electrical mixing unit during the mixing process, per kg of the transition metal oxide.

If the used specific electrical power is less than 0.05 kW per kg of the transition metal oxide, this usually leads to an inhomogeneous distribution of the lithium titanate and/or lithium aluminate, which may be not firmly bonded to the core material of the transition metal oxide.

A specific electrical power of more than 1.5 kW per kg of the transition metal oxide typically leads to poorer electrochemical properties. In addition, there is the risk that the coating will become brittle and prone to fracture.

The nominal electrical power of the mixing unit can vary in a wide range, e.g. from 0.1 kW to 1000 kW. Thus, it is possible to use mixing units on the laboratory scale with a nominal power of 0.1 kW-5 kW or mixing units for the production scale with a nominal electrical power of 10 kW-1000 kW. The nominal electrical power is the nameplate, maximal absolute electrical power of the mixing unit.

It is likewise possible to vary the volume of the mixing unit in a wide range, e.g. from 0.1 L to 2.5 m³. Thus, it is possible to use mixing units on the laboratory scale with a volume of 0.1 L-10 L or mixing units for the production scale with a volume of 0.1 m³-2.5 m³.

The term "volume of the mixing unit" refers in the context of the present invention to the maximal volume of the chamber of the electric mixing unit where the substances to be mixed can be placed.

Preferably, in the process according to the invention, forced mixers are used in the form of intensive mixers with high-speed mixing tools. It has been found that a speed of the mixing tool of 5 m/s-30 m/s, more preferably of 10 m/s-25 m/s, gives the best results. The term "mixing tool" refer in the context of the present invention to any object in the mixing unit, which can be moved, e.g. rotated, shaken etc, and thus mix the contents of the mixing unit. The examples of such mixing tools are stirrer of various form. Commercially available mixing units well suitable for the process of the invention are, for example, Henschel mixers or Eirich mixers.

The mixing time is preferably 0.1 to 120 minutes, more preferably 0.2 to 60 minutes, very preferably 0.5 to 10 minutes.

The inventive process may further comprise thermal treatment of the coated transition metal oxide at a temperature 300° C.-1400° C., preferably 400° C.-1200° C., more preferably 500° C.-1100° C. The duration of the thermal treatment may be 10 minutes to 10 hours, preferably 0.5 hours to 5 hours, more preferably 1 hour to 3 hours. This thermal treatment may improve the binding of the lithium titanate and/or lithium aluminate to the transition metal oxide.

However, this treatment is not necessary in the process according to the invention since in this process, the pyrogenically produced lithium titanate and/or lithium aluminate usually strongly adhere to the transition metal oxide without any thermal treatment. A preferred embodiment of the process according to the invention therefore does not comprise any thermal treatment after the mixing.

The proportion of the lithium titanate and/or lithium aluminate is preferably 0.05%-5% by weight, more preferably 0.1%-2% by weight, related to the total weight of the used mixture of the transition metal oxide and the lithium titanate and/or lithium aluminate. If the proportion of the lithium titanate and/or lithium aluminate is less than about 0.05% by weight, no beneficial effect of the coating can usually be observed. In the case of more than 5% by weight thereof, no beneficial effect of the additional quantity of the lithium titanate and/or lithium aluminate can be observed either.

Pyrogenically Produced Lithium Titanate and Lithium Aluminate

The lithium titanate (LTO) and/or lithium aluminate (LAO) used in the process according to the invention are produced pyrogenically, that means directly by pyrogenic methods, also known as "fumed" methods or by further modification of pyrogenically produced precursors, e.g. of pyrogenically produced $TiO_2$ or $Al_2O_3$. The terms "pyrogenically produced", "pyrogenic" and "fumed" are used as equivalents in the context of the present invention.

Such "pyrogenic" or "fumed" processes involve the reaction of the corresponding metal precursors in a flame hydrolysis or a flame oxidation in an oxyhydrogen flame to form pyrogenically produced compounds. This reaction initially forms highly disperse approximately spherical primary particles, which in the further course of the reaction coalesce to form aggregates. The aggregates can then accumulate into agglomerates. In contrast to the agglomerates, which as a rule can be separated into the aggregates relatively easily by introduction of energy, the aggregates are broken down further, if at all, only by intensive introduction of energy. Said particles may be partially destructed and converted into the nanometre (nm) range particles advantageous for the present invention by suitable grinding. However, such grinding is not required, since the "as-prepared" fumed particles have sufficiently small particle sizes.

Lithium titanate used in the inventive process is preferably a compound of the formula $LiTiO_2$, $Li_2TiO_3$, $Li_2Ti_3O_7$, $Li_4TiO_4$, $Li_4Ti_5O_{12}$, or a mixture thereof.

The flame spray pyrolysis (FSP) process suitable for preparing the lithium titanate may comprise the following steps:
1) at least one solution containing a titanium precursor and a lithium precursor is atomized, e.g. by means of air or an inert gas, preferably using a multi-substance nozzle, and
2) mixed with a combustion gas, preferably hydrogen and/or methane, and air and
3) the mixture is allowed to burn in a flame into a reaction chamber surrounded by a casing,
4) the hot gases and the solid products are cooled and then the solid product is removed from the gases.

Suitable for the production of LTO lithium precursors are for example lithium hydroxide, lithium oxide, lithium carbonate, lithium hydrogencarbonate, lithium carboxylates, such as lithium oxalate, lithium acetate, lithium formate, lithium hexanoate, lithium heptanoate, lithium octoate, lithium 2-ethyl hexanoate, lithium decanoate, lithium neodecanoate, lithium dodecanoate, lithium nitrate, lithium chloride, lithium bromide, lithium sulfate, lithium perchlorate, and the mixtures thereof.

Suitable titanium precursors are e.g. titanium nitrate, titanium (IV) chloride, titanium (IV) oxychloride, titanium (IV) oxysulfate, titanium (IV) oxynitrate, titanium alcoholates such as tetramethylorthotitanate, tetraethylorthotitanate, tetrapropylorthotitanate, tetra(iso-propyl)orthotitanate, and the mixtures thereof.

Further suitable Ti and Li metal precursors are metal carboxylates, particularly metal carboxylates of aliphatic carboxylic acids having 6 to 12 carbon atoms, for example metal octoates or 2-ethylhexanoates, metal decanoates or metal dodecanoates.

The other than Li and Ti metal precursors optionally used for producing of metal doped LTOs may be either inorganic, such as nitrates, chlorides or organic compounds, such as carboxylates.

The used metal precursors may be dissolved in water, an organic solvent or a mixture thereof. Suitable organic solvents include methanol, ethanol, n-propanol, isopropanol, n-butanol, tert-butanol, 2-propanone, 2-butanone, diethyl ether, tert-butyl methyl ether, tetrahydrofuran, C1-C12-carboxylic acids, such as 2-ethylhexanoic acid, ethyl acetate, toluene, petroleum and mixtures thereof.

In the pyrogenic process for producing the lithium titanate, the ratio of titanium to lithium in the starting materials can be adjusted to be equal to or slightly less than the Ti to Li ratio of the desired lithium titanium compound. A small excess of Li beyond the stoichiometric amount, e.g., up to 10% more than the stoichiometric amount, may be added to compensate for the volatilization losses of Li salts during the production process.

Lithium titanate may be further doped with other than lithium and titanium metals, e.g. aluminium (Al), lanthanum (La) and others.

The mean particle diameter $d_{50}$ of the lithium titanate used for producing the coated transition metal oxide is preferably 10 nm-200 nm, more preferably 20 nm-150 nm, even more preferably 30-120 nm, as determined by static light scattering (SLS) after 60 s of ultrasonic treatment at 25 of a 5% by weight dispersion of the particles in water.

Lithium aluminate is a compound of a chemical formula $LiAlO_2$.

The lithium aluminate can be produced by a process, comprising the following steps:
1) preparing an aqueous dispersion comprising a fumed alumina, a lithium oxide precursor compound soluble in water and an alkali metal and/or an ammonium carbonate;
2) Spray drying of the dispersion prepared in step 1) to obtain a dried powder;
3) Calcining the dried powder obtained in step 2) at a temperature of from 450° C. to 750° C.

Lithium aluminate, which is predominantly in alpha crystallographic phase, is preferably used in the inventive process. The term "alpha lithium aluminate" refers to the α-(hexagonal) allotropic form of the lithium aluminate. The term "allotropic form" is used alternatively to the term "crystallographic phase" in the invention. The crystallographic structure of such a crystallographic phase (allotropic form) can be determined by the XRD analysis. In the context of the present invention "predominantly in alpha crystallographic phase" means that the lithium aluminate is at least 70% in the alpha phase, as determined by XRD analysis. The used lithium aluminate preferably comprises at least 80%, more preferably at least 90%, more preferably at least 95% of alpha $LiAlO_2$ phase, as determined by XRD analysis.

The term "soluble in water" refers in the context of the present invention to the solubility of the lithium oxide precursor compound of at least 0.1 g, preferably at least 1.0 g of the compound in 100 g water at 20° C.

The lithium oxide precursor compound soluble in water is preferably selected from the group consisting of lithium hydroxide, lithium oxide, lithium carbonate, lithium hydrogencarbonate, lithium oxalate, lithium acetate, lithium formate, lithium nitrate, lithium chloride, lithium bromide, lithium sulfate, lithium perchlorate, and the mixtures thereof.

The alkali metal carbonate is preferably selected from the group consisting of lithium carbonate, lithium hydrogencarbonate, sodium carbonate, sodium hydrogencarbonate, potassium carbonate, potassium hydrogencarbonate, and the mixtures thereof.

The ammonium carbonate can be a compound with the chemical formula $(NH_4)_2CO_3$ (ammonium carbonate) or $NH_4HCO_3$ (ammonium hydrogencarbonate).

Most preferably, both the lithium oxide precursor compound and the alkali metal carbonate are the same compound lithium carbonate ($Li_2CO_3$).

The fumed alumina used for preparation of lithium aluminate preferably has a BET surface area of 20 $m^2/g$ to 250 $m^2/g$, more preferably 50 $m^2/g$ to 200 $m^2/g$, more preferably 70 $m^2/g$ to 150 $m^2/g$. The BET surface area can be determined according to DIN 9277:2014 by nitrogen adsorption according to Brunauer-Emmett-Teller procedure.

The aqueous dispersion used in step 1) of the process for preparation of lithium aluminate comprises a fumed alumina, a lithium oxide precursor compound soluble in water and an alkali metal and/or an ammonium carbonate. The content of the fumed alumina in the dispersion can be from 0.5% to 20% by weight, more preferably from 1% to 10% by weight, more preferably from 2% to 6% by weight.

The amount of the used lithium oxide precursor compound preferably corresponds to the stoichiometric formation of $LiAlO_2$, i.e. the molar ratio of the elements lithium to aluminium in the aqueous dispersion used in the step 1) of the process is about 1 to 1.

In step 2) of the process, the dispersion prepared in step 1) is subjected to spray drying to evaporate water and other volatiles and obtain dried powder consisting of the particles comprising lithium and aluminium. Spray drying may be carried out in any suitable spray drier.

The dried powder obtained in step 2) of the process preferably delivers particles with numerical mean particle size $d_{50}$ of not more than 20 μm, preferably 1 μm-15 μm, more preferably 2 μm-10 μm. The numerical mean particle size $d_{50}$ of the particles can be determined by static light scattering (SLS) in the aqueous dispersion.

Such spray-dried particles preferably have a narrow particle size distribution. The span of particle size distribution $(d_{90}-d_{10})/d_{50}$ of these particles is preferably not more than 2.5, more preferably 0.8-2.0, more preferably 0.9-1.5.

Step 2) of the process is preferably carried out using an outlet air temperature of the spray drier of 50° C. to 200° C., more preferably 80-150° C., more preferably 90-140° C.

In step 3) of the process, the dried powder obtained in step 2) of the process is calcined at a temperature of from 450° C. to 750° C., preferably 500° C. to 700° C., more preferably 550° C. to 650° C., especially preferably 580° C. to 620° C., to obtain alpha lithium aluminate.

The duration of step 3) can be, depending on the calcination temperature applied, from 1 h to 24 h, preferably from 2 h to 20 h, more preferably from 3 h to 10 h, more preferably from 4 h to 8 h.

Calcination in step 3) may be performed discontinuously, e.g. in a muffle furnace or using another suitable device, or continuously, e.g. in a rotary kiln or any other suitable device.

The obtained lithium aluminate can further be milled, preferably using a ball mill, to reduce the average particle size of the lithium aluminate.

The ball milling is preferably carried out by $ZrO_2$ balls, e.g. with a diameter of about 0.5 mm in an appropriate solvent, such as ethanol or isopropanol.

The above-described process for preparation of lithium aluminate allows preparation of lithium aluminate in alpha crystallographic form, with high surface area, small particle size and narrow particle size distribution.

The numerical mean particle size $d_{50}$ of the thus prepared lithium aluminate is usually not more than 20 μm, preferably 1 μm-15 μm, more preferably 2 μm-10 μm. Span of particle size distribution $(d_{90}-d_{10})/d_{50}$ of lithium aluminate is preferably not more than 2.5, preferably 0.8-2.0, more preferably 0.9-1.5.

The numerical mean diameter of primary particles of the lithium aluminate is typically 1 nm-100 nm, preferably 3-70 nm, more preferably 5-50 nm, as determined by transition electron microscopy (TEM). This numerical mean diameter can be determined by calculating the average size of at least 500 particles analysed by TEM.

Thus, both the pyrogenically produced lithium titanate and lithium aluminate used in the process of the present invention is preferably characterized by a high dispersibility, i.e. the ability to form relatively small particles under mild ultrasonic treatment. It is believed, that dispersion under such mild conditions correlates with the conditions during the dry coating process. That means, the agglomerates of the lithium titanate and/or lithium aluminate are destroyed in the mixing process of the present invention in a similar way as under the ultrasonic treatment and are able to form homogeneous coating of the transition metal oxide.

Preferably, the particle diameter $d_{90}$ of the lithium titanate and/or lithium aluminate used for producing the coated transition metal oxide is not more than 500 nm, more preferably not more than 300 nm, even more preferably not more than 200 nm, as determined by static light scattering (SLS) after 60 s of ultrasonic treatment at 25° C. of a 5% by weight dispersion of the particles in water.

The relatively low value $d_{90}$ of the used lithium titanate and/or lithium aluminate ensures an extremely low ratio of large LTO and/or LAO particles and eventually a very homogeneous distribution of the lithium titanate and/or lithium aluminate on the surface of the transition metal oxide.

The pyrogenically produced lithium titanate and/or lithium aluminate used in the process of the present invention is preferably characterized by a relatively narrow particle size distribution and/or relatively low content of both very fine (particle size <10 nm) and large particles (particle size >300 nm). This helps to achieve high-quality lithium titanate coating on the surface of the transition metal oxide. Large particles are not desirable preventing creating a homogeneous coating, whereas handling of very fine particles often poses a problem associated with dust formation.

The values $d_{10}$, $d_{50}$ and $d_{90}$ are commonly used for characterizing the cumulative particle diameter distribution of a given sample. For example, the $d_{10}$ diameter is the diameter at which 10% of a sample's volume is comprised of smaller than $d_{10}$ particles, the $d_{50}$ is the diameter at which 50% of a sample's volume is comprised of smaller than $d_{50}$ particles. The $d_{50}$ is also known as the "volume median diameter" as it divides the sample equally by volume; the $d_{90}$ is the diameter at which 90% of a sample's volume is comprised of smaller than $d_{90}$ particles.

It has been found that the best results regarding the adhesion of the lithium titanate and/or lithium aluminate to the transition metal oxide are obtained when the lithium titanate and/or lithium aluminate has a BET surface area of 10 m$^2$/g-200 m$^2$/g, more preferably of 10 m$^2$/g-100 m$^2$/g, more preferably of 20 m$^2$/g-80 m$^2$/g and most preferably of 30 m$^2$/g-60 m$^2$/g. The BET surface area can be determined according to DIN 9277:2014 by nitrogen adsorption according to Brunauer-Emmett-Teller procedure.

The lithium titanate and/or lithium aluminate is preferably not surface treated by any surface treatment agents, such as silanes, after its synthesis by a pyrogenic process. The LTO and/or LAO particles thus produced usually have a purity of at least 96% by weight, preferably at least 98% by weight, more preferably at least 99% by weight.

The lithium titanate and/or lithium aluminate used in the invention preferably has a tamped density of 20 g/L-800 g/L, more preferably 50 g/L-500 g/L, even more preferably 100 g/L-400 g/L, still more preferably 200 g/L-300 g/L.

Tamped density of a pulverulent or coarse-grain granular material can be determined according to DIN ISO 787-11: 1995 "General methods of test for pigments and extenders—Part 11: Determination of tamped volume and apparent density after tamping". This involves measuring the apparent density of a bed after agitation and tamping.

Transition Metal Oxide

The term "transition metal" in the context of the present invention comprises the following elements: Ti, V, Cr, Mn, Fe, Co, Ni, Cu, Zn, Nb, Mo, Ru, Rh, Pd, Ag, Cd, Ta, W, Re, Os, Ir, Pt, Au. Preferably, the transition metal is chosen from the group consisting of nickel, manganese, cobalt, and a mixture thereof.

The transition metal oxide used with preference in the process according to the invention is selected from the group consisting of cobalt oxides, manganese oxides, mixed nickel-cobalt oxides, mixed nickel-manganese-cobalt oxides, mixed nickel-cobalt-aluminium oxides, mixed nickel-manganese oxides, or a mixture thereof.

The transition metal oxide preferably further comprises lithium and has a general formula LiMO$_2$, wherein M is at least one transition metal selected from nickel, cobalt, manganese; more preferably M=Co or Ni$_x$Mn$_y$Co$_z$, wherein $0.3 \leq x \leq 0.9$, $0 \leq y \leq 0.45$, $0 \leq z \leq 0.4$, The lithium transition metal oxide of the general formula LiMO$_2$ can be further doped with at least one other, non-transition metal oxide, particularly with aluminium oxide and/or titanium oxide and/or zirconium oxide.

Coated Transition Metal Oxide

The invention further provides a coated transition metal oxide containing a core consisting of a transition metal oxide and a shell comprising pyrogenically produced lithium titanate with a number average particle size $d_{50}$ of 10 nm-200 nm, preferably 20 nm-150 nm, more preferably 30 nm-30 nm, and/or pyrogenically produced lithium aluminate with a number average particle size $d_{50}$ of less than 20 μm, preferably 1 μm-15 μm, more preferably 2 μm-10 μm, more preferably 2.5 μm-8.0 μm. The pyrogenically produced lithium titanate and/or the pyrogenically produced lithium aluminate on the surface of transition metal particles, is in the form of aggregated primary particles. The number average particle size $d_{50}$ of the pyrogenically produced lithium titanate and/or the pyrogenically produced lithium aluminate in the coated mixed lithium transition metal oxide can be measured by transmission electronic microscopy (TEM) analysis. This number average particle size $d_{50}$ can be determined by calculating the average size of at least 500 particles analysed by TEM. The $d_{50}$ value obtained from TEM analysis is usually near to the average particle size $d_{50}$ value for the pyrogenically produced lithium titanate or the pyrogenically produced lithium aluminate used in the inventive process, determined by static light scattering (SLS) after 60 s of ultrasonic treatment at 25° C. of a 5% by weight dispersion of the particles in water.

This inventive coated transition metal oxide is preferably obtained by the above-described process according to the invention.

The coated transition metal oxide of the invention preferably has a numerical mean particle diameter of 2 μm-20 μm. The numerical mean particle diameter can be determined according to ISO 13320:2009 by laser diffraction particle size analysis.

The coated transition metal oxide preferably has an LTO and/or LAO coating layer thickness of about 10 nm-200 nm, as determined by TEM analysis.

The proportion of the lithium titanate and/or the lithium aluminate in the coated transition metal oxide is preferably 0.05%-5% by weight, more preferably 0.1%-2% by weight, related to the total weight of the transition metal oxide and the lithium titanate and/or the lithium aluminate. If the proportion of the lithium titanate and/or lithium aluminate is less than about 0.05% by weight, no beneficial effect of the coating can usually be observed. In the case of more than 5% by weight thereof, no beneficial effect of the additional quantity of the lithium titanate and/or the lithium aluminate can be observed either.

The further preferred features of the pyrogenically produced lithium titanate and/or the lithium aluminate employed in the inventive process described above are also the preferred features for the lithium titanate and/or lithium acuminate present as coating on the transition metal oxide, independent on whether the coated transition metal oxide is produced by the inventive process or not.

Use of the Coated Transition Metal Oxide in Lithium Ion Batteries

The invention further provides an active positive electrode material for a lithium ion battery comprising the coated transition metal oxide according to the invention.

The positive electrode, also known as the cathode, of the lithium ion battery usually includes a current collector and an active cathode material layer formed on the current collector.

The current collector may be an aluminium foil, a copper foil, a nickel foil, a stainless-steel foil, a titanium foil, a polymer substrate coated with a conductive metal, or a combination thereof.

The active positive electrode (cathode) material may include materials capable of reversible intercalating/deintercalating lithium ions and are well known in the art. Such active cathode material may include transition metal oxides, such as mixed oxides comprising Ni, Co, Mn, V or other transition metals and optionally lithium. Especially preferably are the mixed transition metal oxides comprising nickel, manganese and cobalt (NMC).

The invention also provides a lithium ion battery comprising the inventive coated transition metal oxide.

The lithium ion battery of the invention, apart from the cathode, may contain an anode, optionally a separator and an electrolyte comprising a lithium salt or a lithium compound.

The anode of the lithium battery may comprise any suitable material, commonly used in the secondary lithium batteries, capable of reversible intercalating/deintercalating lithium ions. Typical examples thereof are carbonaceous materials including crystalline carbon such as natural or artificial graphite in the form of plate-like, flake, spherical or fibrous type graphite; amorphous carbon, such as soft carbon, hard carbon, mesophase pitch carbide, fired coke and the like, or mixtures thereof. In addition, lithium metal or conversion materials (e.g. Si or Sn) can be used as anode active materials.

Lithium ion battery of the invention can contain a liquid, gel, polymer or solid electrolyte.

The liquid mixture of the lithium salt and the organic solvent, which is not cured, polymerized or cross-linked, is referred to as "liquid electrolyte" in the context of the present invention. The gelled or solid mixture comprising a cured, polymerized or cross-linked compound or their mixtures, optionally a solvent, and the lithium salt is referred to as a "gel electrolyte" or "polymer electrolyte". Such electrolytes can be prepared by polymerization or cross-linking of a mixture, containing at least one reactive, i.e. polymerizable or cross-linkable, compound and a lithium salt.

The liquid electrolyte of the lithium ion battery may comprise any suitable organic solvent commonly used in the lithium ion batteries, such as anhydrous ethylene carbonate (EC), dimethyl carbonate (DMC), propylene carbonate, methylethyl carbonate, diethyl carbonate, gamma butyrolactone, dimethoxyethane, fluoroethylene carbonate, vinylethylene carbonate, or a mixture thereof.

The electrolyte of the lithium ion battery usually contains a lithium salt. Examples of such lithium salts include lithium hexafluorophosphate ($LiPF_6$), lithium bis 2-(trifluoromethylsulfonyl)imide (LiTFSI), lithium bis (fluorosulfonyl) imide (LiFSI), lithium perchlorate ($LiClO_4$), lithium tetrafluoroborate ($LiBF_4$), $Li_2SiF_6$, lithium triflate, LiN$(SO_2CF_2CF_3)_2$ and mixtures thereof.

Lithium on battery according to the invention can also be the one of a solid-state type. Such a battery can comprise various types of solid electrolytes. The solid electrolyte of the lithium battery may comprise oxides, e.g. lithium metal oxides, sulfides, phosphates, or solid polymers.

The invention further provides the use of the coated transition metal oxide of the invention in a lithium ion battery, particularly as a constituent of a positive active electrode of the lithium ion battery.

DESCRIPTION OF THE DRAWINGS

Figure 1B:
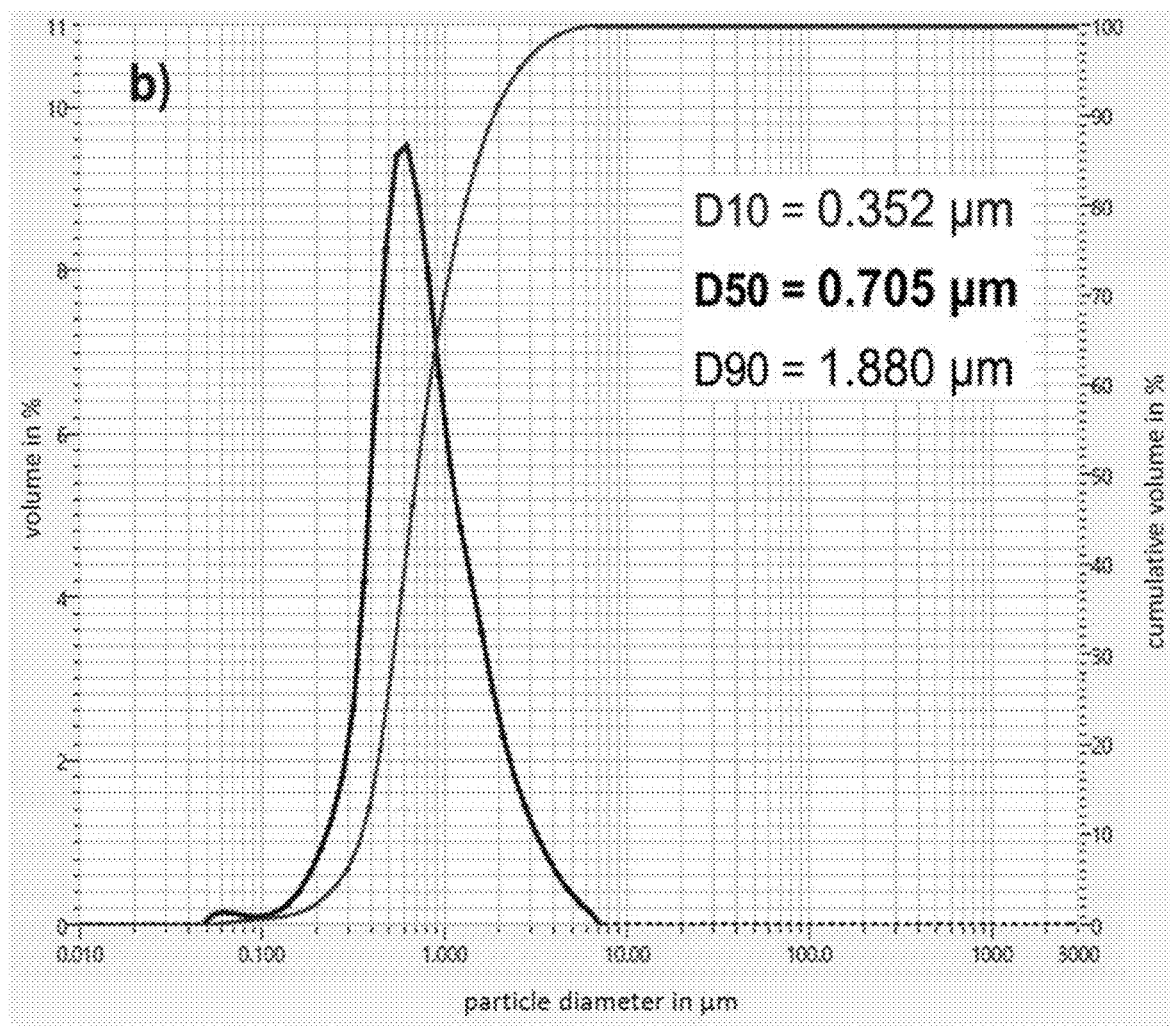
FIG. 1B shows the particle size distribution of commercial "nano LTO", analyzed by a laser diffraction particle size analyzer.

FIGS. 1A-1B shows the particle size distribution of fumed LTO (1A) and commercial "nano LTO" (1B), analyzed by a laser diffraction particle size analyzer.

FIGS. 2A-2F shows SEM images of NMC dry coated with fumed LTO (2A—backscattered electrons (BSE) image, 2B—EDX mapping of Ti, 2C—high resolution SEM image) in comparison to NMC dry coated with a commercial "nano LTO" (2D—BSE image, 2E—EDX mapping of Ti, 2F—high resolution SEM image).

FIGS. 3A-3F shows SEM images of NMC dry coated with fumed LTO (3A—BSE image, 3B—EDX mapping of Ti, 3C—high resolution SEM image) in comparison to NMC wet coated with fumed LTO (3D—BSE image, 3E—EDX mapping of Ti, 3F—high resolution SEM image).

Figure 4:
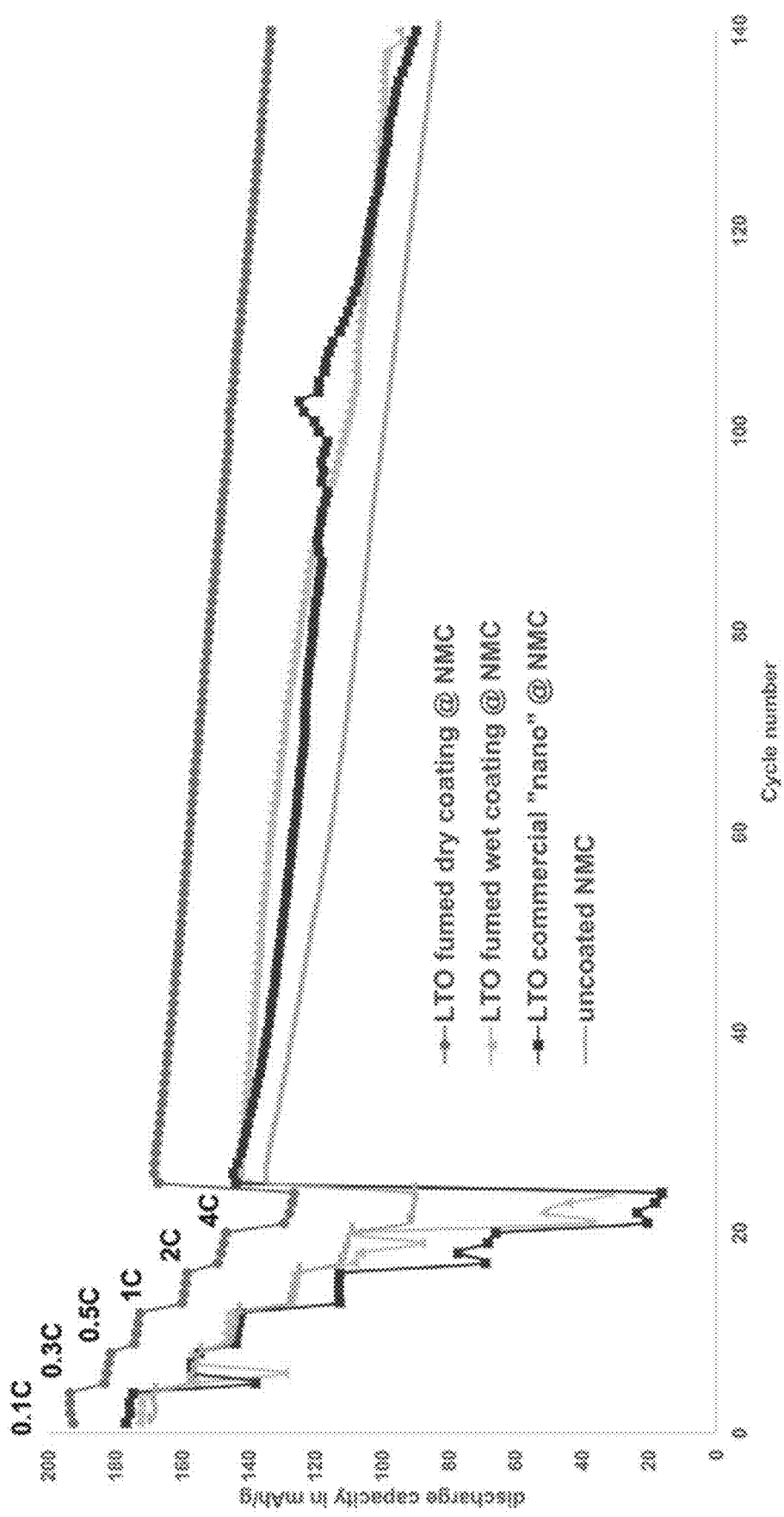
FIG. 4 shows the cycling performance of uncoated NMC, NMC dry coated with commercial "nano LTO" as well as NMC wet and dry coated with 1 wt % of fumed LTO NMC in lithium ion batteries with liquid electrolyte.

FIG. 4 shows the cycling performance of uncoated NMC, NMC dry coated with commercial "nano LTO" as well as NMC wet and dry coated with 1 wt % of fumed LTO NMC in lithium ion batteries with liquid electrolyte.

Figure 5:
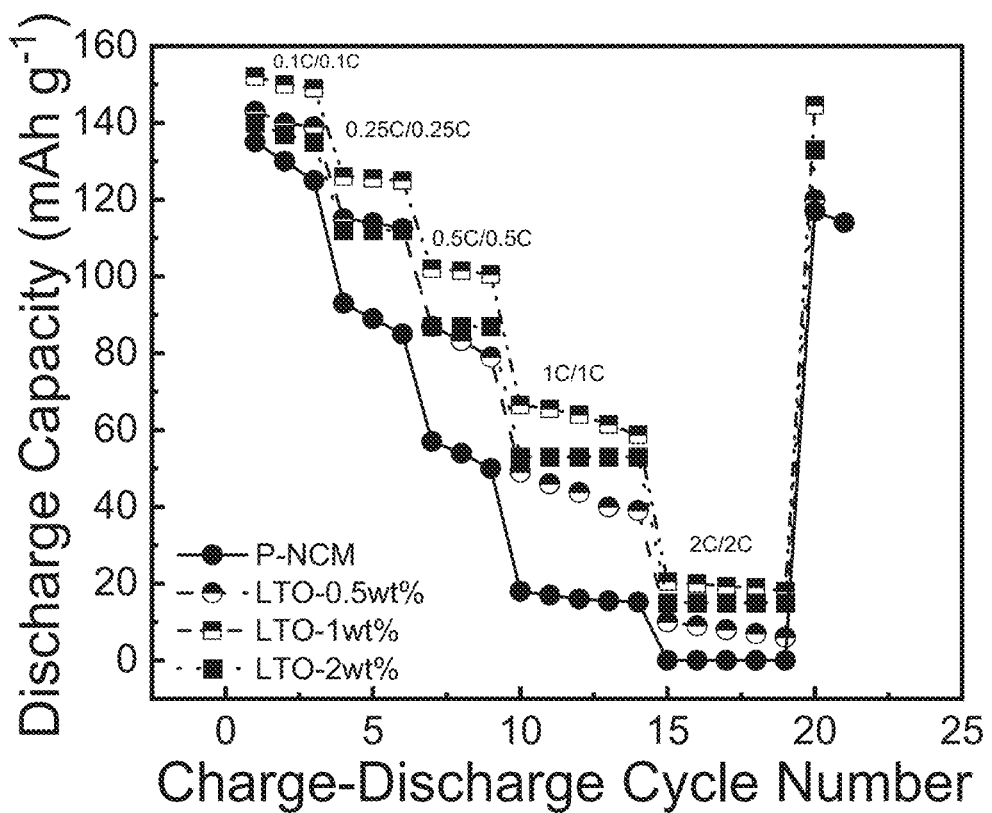
FIG. 5 shows the rate performance at between 0.1C and 2C of uncoated NMC and NMC coated with 0.5 wt %, 1 wt % and 2 wt % of fumed LTO in all-solid-state lithium ion batteries (System: $Li_6PS_5Cl$-NMC-VGCF$\|Li_6PS_5Cl\|$Li—In).

FIG. 5 shows the rate performance at between 0.1C and 2C of uncoated NMC and NMC coated with 0.5 wt %, 1 wt % and 2 wt % of fumed LTO in all-solid-state lithium ion batteries (System: $Li_6PS_5Cl$-NMC-VGCF∥$Li_6PS_5Cl$∥Li—In).

Figure 6:
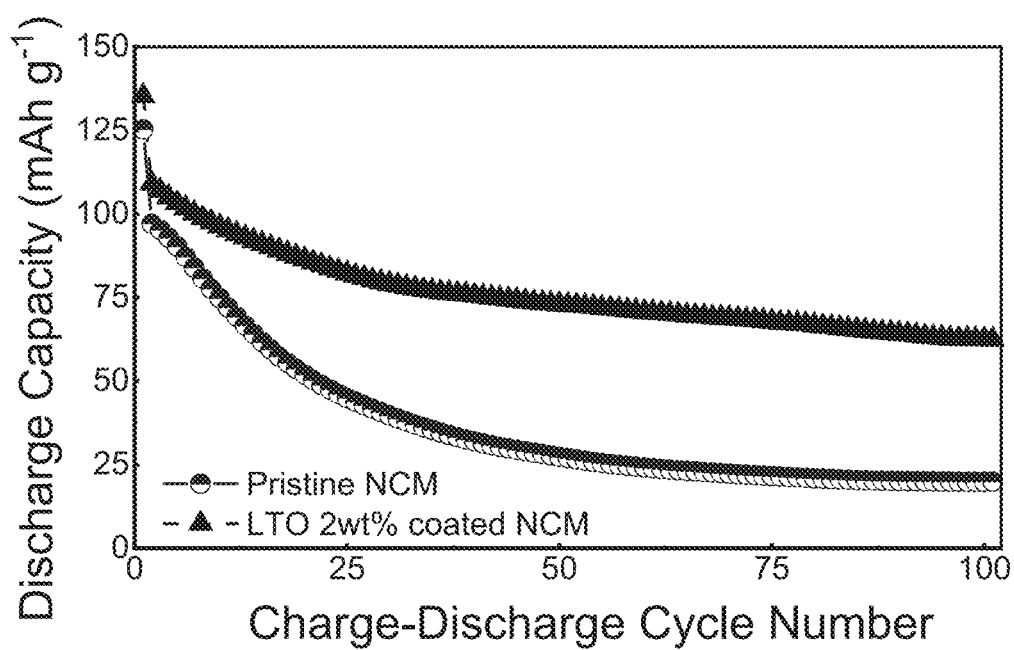
FIG. 6 shows the cycling performance over 100 cycles of uncoated NMC and NMC coated with 2 wt % of fumed LTO (System: $Li_6PS_5Cl$-NMC$\|Li_6PS_5Cl\|$Li—In).

FIG. 6 shows the cycling performance over 100 cycles of uncoated NMC and NMC coated with 2 wt % of fumed LTO (System: $Li_6PS_5Cl$-NMC∥$Li_6PS_5Cl$∥Li—In).

Figure 7:
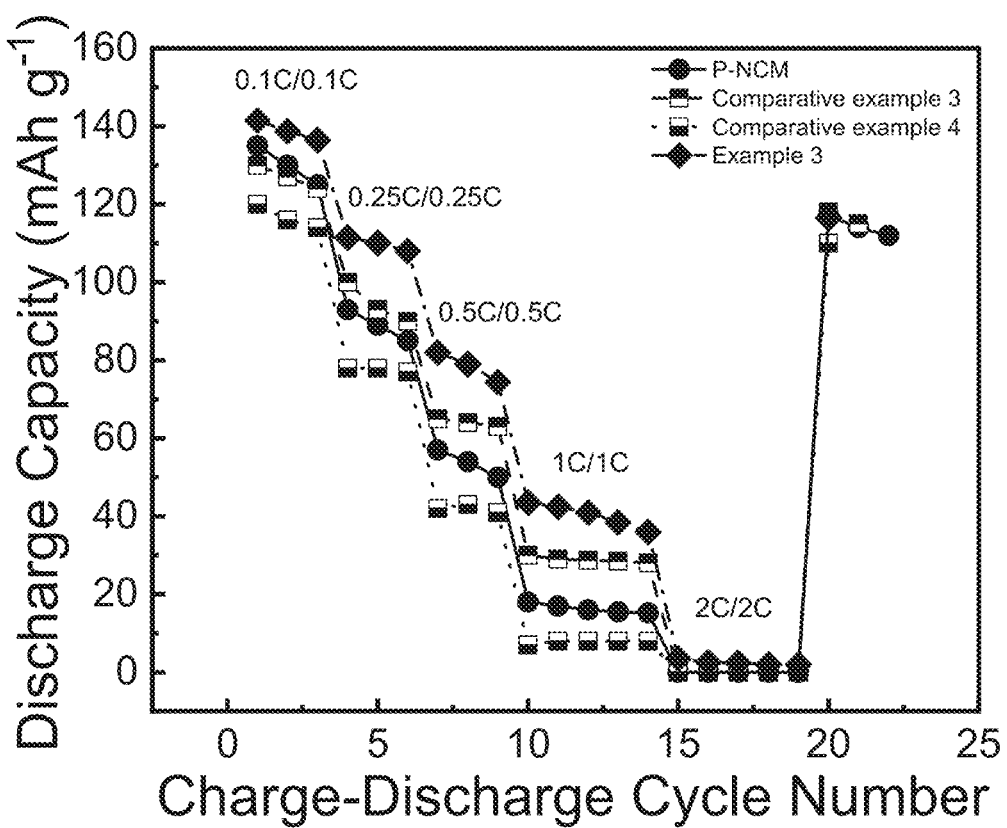
FIG. 7 shows the rate performance at between 0.1C and 2C of uncoated NMC and NMC coated with 1 wt % AEROXIDE® Alu 65, AEROXIDE® Alu 130 and nanostructured $LiAlO_2$ power in all-solid-state lithium ion batteries (System: $Li_6PS_5Cl$-NMC-VGCF$\|Li_6PS_5Cl\|$Li—In).

FIG. 7 shows the rate performance at between 0.1C and 2C of uncoated NMC and NMC coated with 1 wt % AEROXIDE® Alu 65, AEROXIDE® Alu 130 and nano-structured $LiAlO_2$ power in all-solid-state lithium ion batteries (System: $Li_6PS_5Cl$-NMC-VGCF∥$Li_6PS_5Cl$∥Li—In).

EXAMPLES

Starting Materials:

Fumed lithium titanate $Li_4Ti_5O_{12}$ (LTO) with a specific surface area (BET) of 47 $m^2$/g was prepared by a flame spray pyrolysis method.

Commercial "nano LTO" powder with a BET surface area of 5.1 $m^2$/g was provided by SAT nano technology material Co. LTD.

Commercial nickel manganese cobalt mixed oxide powder NMC 7 1.5 1.5 (Linyi Gelon LIB Co., Type PLB-H7) with a BET surface area of 0.30-0.60 $m^2$/g, medium diameter $d_{50}$=10.6±2 µm (determined by laser scattering method).

FIGS. 1A-1B shows the particle size distribution of fumed LTO (1A) and commercial "nano LTO" (1B), analyzed by a laser diffraction particle size analyzer. The samples were dispersed in distilled water and treated for 15 minutes in an external ultrasonic bath (160W). For fumed LTO a mono-modally and very narrow particle size distribution was detected (FIG. 1A), while a significantly larger average particle size and broader particle size distribution were characteristic for commercial "nano LTO" (FIG. 1B).

Preparation of Fumed Lithium Titanate $Li_4Ti_5O_{12}$ (LTO)

10.5 Kilogram of a solution containing 3911.3 g of a commercial solution (Borchers® Dem Lithium2), containing 2 wt % lithium in the form of lithium neodecanoate dissolved in naphtha, 4107.3 g of a commercial solution (TIB Kat 530), containing 16.5 wt % Ti in the form of tetrapropylorthotitanate and 2485 g of ethanol. This solution corresponding to a composition of $Li_4Ti_5O_{12}$.

An aerosol of 2.5 kg/h of this dispersion and 15 $Nm^3$/h of air was formed via a two-component nozzle and sprayed into a tubular reaction with a burning flame. The burning gases of the flame consisted of 10 $Nm^3$/h of hydrogen and 55 $Nm^3$/h of air. Additionally, 40 $Nm^3$/h of secondary air was used. After the reactor the reaction gases were cooled down and filtered. The particle size distribution of this powder is shown in FIG. 1A.

Preparation of $LiAlO_2$ (LAO)

60 Grams of a pyrogenic aluminium oxide AEROXIDE® Alu C (manufactured by Evonik Industries AG) were dispersed in a solution of 84 g $(NH_4)_2CO_3$ in 900 g water. A solution of the stochiometric amount of LiOH to obtain LiAlO$_2$ in 500 g water was added. This dispersion was spray-dried on a laboratory spray drier (Büchi T0630) with an inlet air temperature of 230° C. and outlet air temperature of 130° C. The obtained powder was subjected to calcination at 600° C. for 6 h. The obtained powder had a BET surface area of 64 m$^2$/g.

Example 1

The NMC powder was mixed with the respective amount (1.0 wt %) of a fumed LTO powder in a high intensity laboratory mixer (SOMAKON mixer MP-GL with 0.5 L mixing unit) at first for 1 min at 500 rpm to homogeneously mix the two powders. Afterwards the mixing intensity was increased to 2000 rpm for 5 min to achieve the dry coating of the NMC particles by LTO.

LTO coating layer thickness on NMC particles was about 15-200 nm.

Comparative Example 1

The procedure was identical to that of example 1 except that the commercial "nano LTO" powder was used instead of the fumed LTO powder.

Comparative Example 2

Fumed LTO (0.50 g) was milled in toluene (150 mL) with a high shear rotor stator mixer (Polytron PT 6100) at 25000 rpm for 30 min. The NMC powder (50.0) was suspended in toluene (100 mL). Afterwards, the LTO suspension was added dropwise under stirring to the NMC suspension. This mixture was stirred for additional 15 min. The solvent was removed by evaporation and the residual powder was dried in vacuum at room temperature.

Figure 2C:
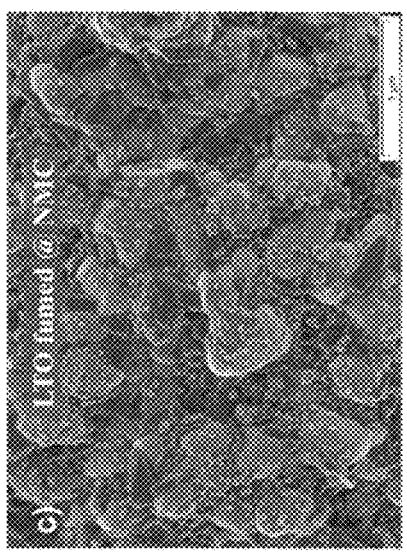
FIG. 2C shows a high resolution SEM image of NMC dry coated with fumed LTO.
Figure 2B:
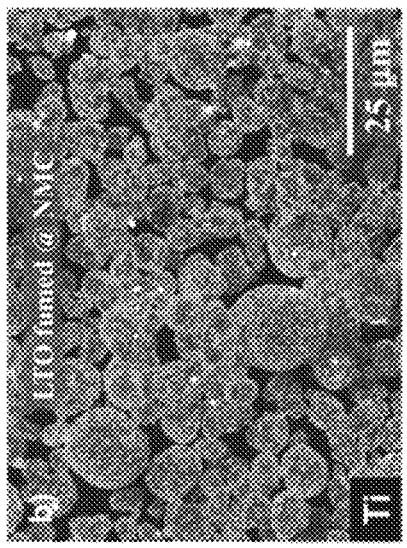
FIG. 2B shows an EDX mapping of Ti of NMC dry coated with fumed LTO.
Figure 2A:
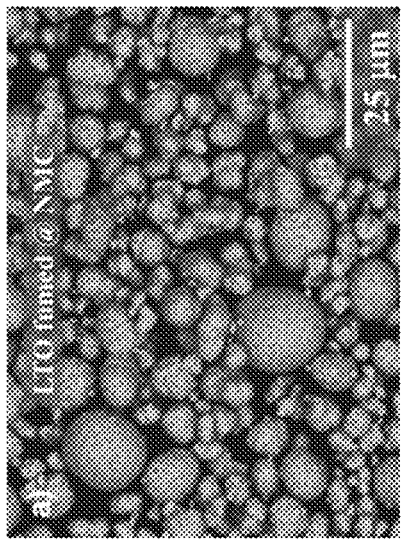
FIG. 2A shows a backscattered electrons (BSE) image of NMC dry coated with fumed LTO.
Figure 2F:
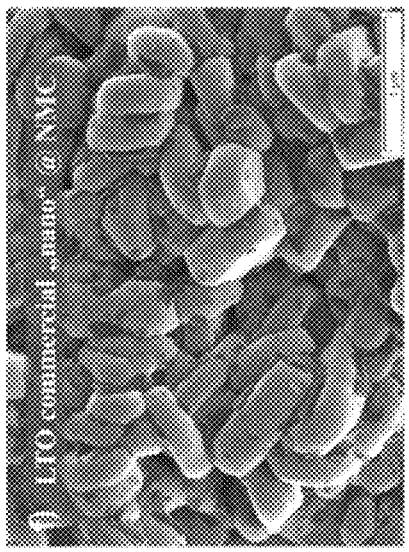
FIG. 2F shows a high resolution SEM image of NMC dry coated with a commercial "nano LTO".
Figure 2E:
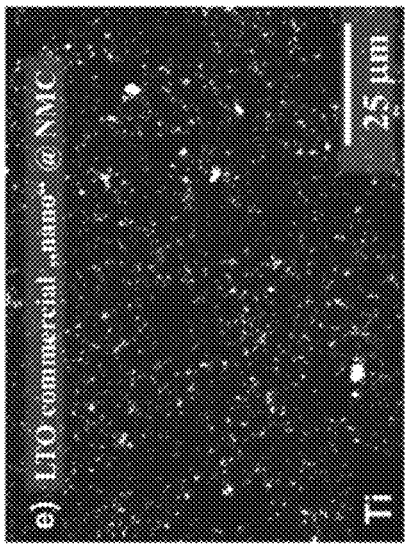
FIG. 2E shows an EDX mapping of Ti of NMC dry coated with a commercial "nano LTO".
Figure 2D:
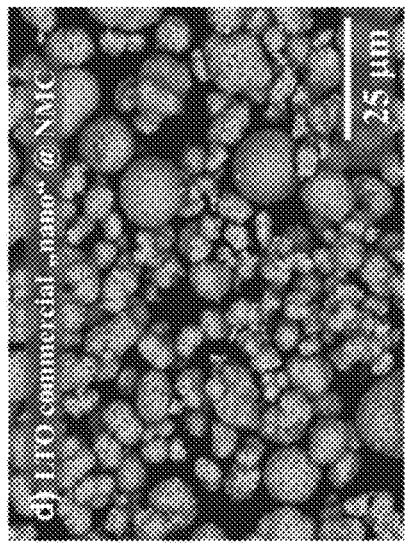
FIG. 2D shows a backscattered electrons (BSE) image of NMC dry coated with a commercial "nano LTO".

FIGS. 2A-2F shows SEM-images of NMC dry coated with LTO (FIGS. 2A-2C: fumed LTO, FIGS. 2D-2F: commercial "nano LTO"). Comparison of the back-scatter electron image (2A) and the EDX-mapping of Ti (2B) of NMC dry coated with fumed LTO reveals a complete and homogeneous coverage of all cathode particles with fumed LTO. No larger LTO agglomerates were detected, showing that a good dispersion of nanostructured fumed LTO particles was achieved. Additionally, no free unattached LTO-particles next to the cathode particles were found, indicating the strong adhesion between the coating and the substrate. The high-resolution SEM image (2C) shows a homogeneous distribution of fumed LTO with a high degree of surface coverage of the CAM. In contrast, comparison of the material contrast image (2D) and the EDX mapping of Ti (2E) of NMC dry coated with commercial "nano LTO" shows that the larger LTO-particles are mostly non-dispersed and therefore unattached, located next to the cathode particles. The high-resolution SEM image (2F) shows that only a small part of the LTO-particles is attached to the cathode material surface. As a result, the NMC particles are only sparsely covered with LTO.

Figure 3C:
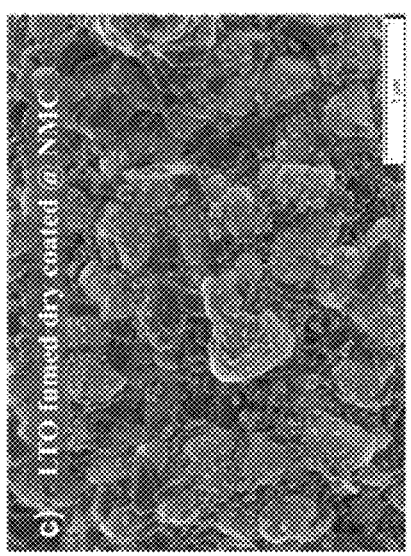
FIG. 3C shows a high resolution SEM image of NMC dry coated with fumed LTO.
Figure 3F:
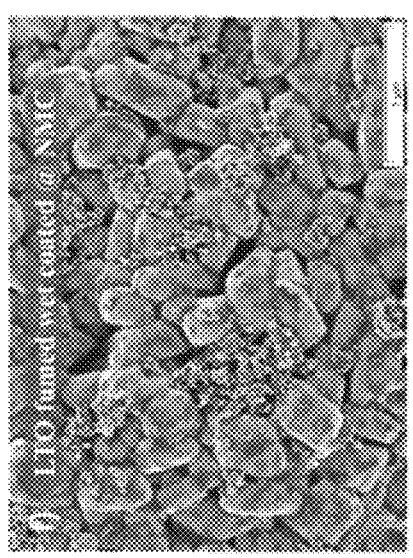
FIG. 3F shows a high resolution SEM image of NMC wet coated with fumed LTO.
Figure 3B:
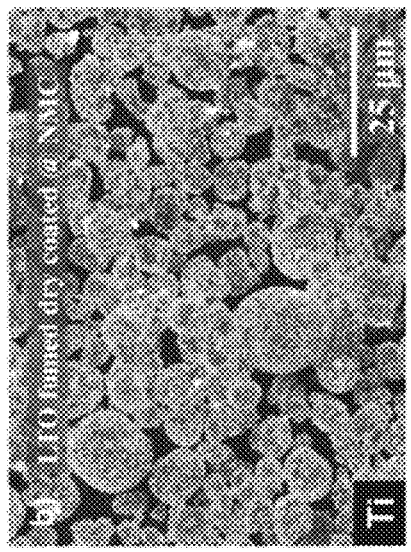
FIG. 3B shows an EDX mapping of Ti of NMC dry coated with fumed LTO.
Figure 3E:
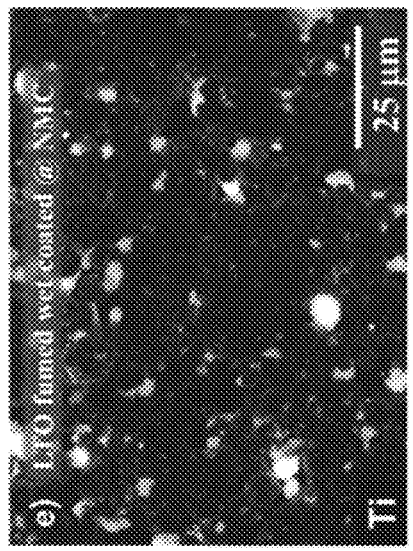
FIG. 3E shows an EDX mapping of Ti of NMC wet coated with fumed LTO.
Figure 3A:
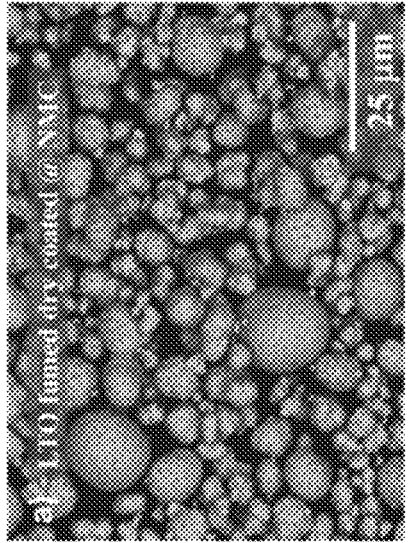
FIG. 3A shows a backscattered electrons (BSE) image of NMC dry coated with fumed LTO.
Figure 3D:
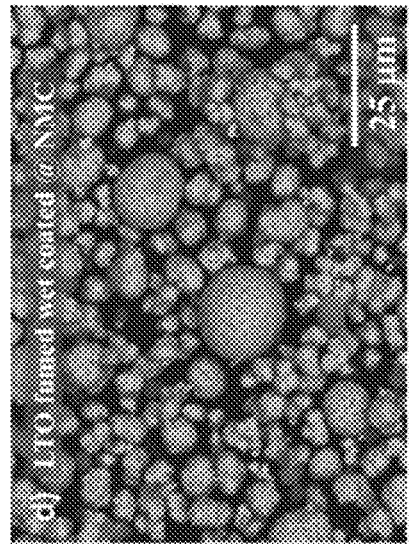
FIG. 3D shows a backscattered elections (BSE) image of NMC wet coated with fumed LTO.

FIGS. 3A-3F shows SEM images of NMC dry coated with fumed LTO (FIGS. 3A-3C) in comparison to NMC wet coated with fumed LTO (FIGS. 3D-3F).

The back-scatter image (3D) and the EDX mapping of Ti (3E) of NMC wet coated with fumed LTO shows that the shear forces in the liquid medium are not sufficient to fully de-agglomerate the fumed LTO agglomerates. Consequently, large LTO-agglomerates are present next to the cathode particles. The NMC particles are only sparsely covered with an inhomogeneous LTO coating layer (high resolution image 3F).

Electrochemical Tests of Lithium Ion Batteries with Liquid Electrolytes

Electrodes for electrochemical measurements were prepared by blending 90 wt % NMC with 5 wt % PVDF (Solef PVDF 5130) as a binder and 5 wt % SUPER PLi (TIMCAL) as a conductive additive under inert gas atmosphere. N-Methyl-2-pyrrolidone (NMP) was used as a solvent. The slurry was casted on aluminum foil and dried for 20 min at 120° C. on a heating plate in air. Afterwards, the electrode sheet was dried in a vacuum furnace at 120° C. for 2 h. Circular electrodes with a diameter of 12 mm were punched out, calendered with a pressure of 90 psi, and dried again in a vacuum furnace at 120° C. for 12 h to remove any residual water and NMP. For the cycling tests the cells were assembled as CR2032 type coin cells (MTI Corporation) in an argon-filled glovebox (GLOVEBOX SYSTEMTECHNIK GmbH). Lithium metal (ROCKWOOD LITHIUM GmbH) is used as the anode material. Celgard 2500 was used as the separator. 25 μL of a 1M solution of LiPF$_6$ in ethylene carbonate and ethyl methyl carbonate (50:50 wt/wt; SIGMA-ALDRICH) was used as electrolyte. The cells were locked with a crimper (MTI).

For electrochemical evaluations galvanostatic cycling was performed between 3.0 and 4.3 V. For the calculation of the capacities and the specific currents, only the mass of the active material was considered. For the coin half-cells during cycling, the C-rate was increased every four cycles, starting from 0.1/0.1 (Charge/Discharge) to 0.3/0.3, 0.5/0.5, 1.0/1.0, 1.0/2.0 and 1.0/4.0 C. Afterward, the cells were cycled at 0.5/0.5 C for long term stability test.

FIG. 4 shows the influence of LTO coating layers on the cycling performance. The performance of NMC dry coated with fumed LTO is compared with that of the NMC dry coated with commercial "nano LTO" and of the NMC wet coated with fumed LTO. The cycling performance of the uncoated NMC is shown as a reference. It can be readily recognized from the shown graphs that the dry coated fumed LTO coating improves the stability and cycle life of NMC the best. The NMC dry coated with fumed LTO shows a higher discharge capacity over all cycles, the rate test at the beginning and the long-term cycling test. It also shows higher initial specific discharge capacities than the other samples at 0.1 C. The cells with NMC dry coated with commercial "nano LTO" and the NMC wet coated with fumed LTO, show significantly worse cycling performance. The rate performance thereof is even worse than that of the uncoated NMC. Only the long-term cycling performance is improved slightly compared to the uncoated NMC, but it is still inferior to the performance of NMC dry coated with fumed LTO.

Example 2

The NMC powder was mixed with the respective amounts (0.5 wt %, 1.0 wt % and 2 wt %) of the fumed LTO powder in a high intensity laboratory mixer (SOMAKON mixer MP-GL with 0.5 L mixing unit) at first for 1 min at 500 rpm to homogeneously mix the two powders. Afterwards the mixing intensity was increased to 2000 rpm for 5 min to achieve the dry coating of the NMC particles by LTO. LTO coating layer thickness on NMC particles was about 20-200 nm.

Electrochemical Tests of Lithium Ion Batteries with Solid Electrolytes $Li_6PS_5Cl$-NMC-VGCF||$Li_6PS_5Cl$||Li—In all-solid-state lithium ion batteries (ASSLIBs) were fabricated with $Li_6PS_5Cl$-NMC-VGCF as a cathode, $Li_6PS_5Cl$ as a solid electrolyte, and a Li—In foil as an anode. The electrolyte layer was obtained by compressing $Li_6PS_5Cl$ powder manually by hand in a poly(ether-ether-ketone) mold with a diameter of 12 mm. Subsequently, the cathode composite powder was pressed on the top of the pellet at ~380 MPa. The composite cathode loading was around 15.3 mg×cm$^{-2}$. After that, the Li—In foil was attached on the other side of the pellet as the anode. Finally, an external frame is used around the cell casing applying a constant pressure of ~50 MPa. The electrochemical performance of all-solid-state cells was tested in using a (pellet-type) cell casing manufactured in house. Galvanostatic cycling was performed between 2.0 and 3.7 V (vs. Li$^+$/Li—In). For the calculation of the capacities and the specific currents, only the mass of the active material was considered. During cycling, the C-rate was increased, starting from 0.1/0.1 (Charge/Discharge), 0.25/0.25, 0.5/0.5, 1.0/1.0 and 2.0/2.0 (three cycles for each until 0.5C and 5 cycles for each from 1.0C to 2.0C). Afterward, the cell was cycled at 0.25/0.25 C for long term stability test at 25° C.

FIG. 5 shows the cycling performance over about 20 cycles of NMC coated with 0.5 wt %, 1 wt % and 2 wt % fumed LTO in $Li_6PS_5Cl$-NMC-VGCF||$Li_6PS_5Cl$||Li—In ASSLIBs compared with the performance of uncoated NMC as a reference. For all coated NMCs, a significantly improved cycling performance was achieved. The NMCs dry coated by fumed LTO show higher discharge capacities over 100 cycles compared to uncoated NMC in FIG. 6. The best performance was obtained by NMC coated with a coating fraction of ½ wt % of fumed LTO.

Comparative Example 3

The procedure was identical to that of example 2 except that AEROXIDE® Alu 65 (manufacturer: Evonik Industries AG) powder with 1.0 wt % was used instead of the fumed LTO powder.

Comparative Example 4

The procedure was identical to that of comparative example 2 except that AEROXIDE® Alu 130 powder (manufacturer: Evonik Industries AG) with 1.0 wt % was used instead of the fumed LTO powder.

Example 3

The procedure was identical to that of comparative example 2 except that nanostructured $LiAlO_2$ powder with 1.0 wt % was used instead of the fumed LTO powder.

FIG. 7 shows the rate performance of NMC coated with 1 wt % AEROXIDE® Alu 65, AEROXIDE® Alu 130 and nanostructured $LiAlO_2$ power in $LiBPS_5Cl$-NMC-VGCF||$Li_6PS_5Cl$||Li—In ASSLIBs compared with the performance of uncoated NMC as a reference. The best performance was obtained by NMC coated with a coating fraction of 1 wt % of nanostructured $LiAlO_2$ power.

The invention claimed is:

1. A process for producing a coated transition metal oxide, the process comprising:
   dry mixing a transition metal oxide and a pyrogenically produced lithium titanate and/or a pyrogenically produced lithium aluminate,
   wherein the dry mixing comprises dry mixing 0.05 to 2% by weight of the pyrogenically produced lithium titanate and/or the pyrogenically produced lithium aluminate, wherein the % by weight is relative to a total weight of a mixture of the transition metal oxide and the pyrogenically produced lithium titanate and/or the pyrogenically produced lithium aluminate,
   with the transition metal oxide,
   to thereby produce the coated transition metal oxide.

2. The process according to claim 1, wherein the dry mixing is carried out by an electric mixing unit having a specific electrical power of 0.05 kW-1.5 kW per kg of the transition metal oxide.

3. The process according to claim 1, wherein the Brunauer-Emmett-Teller (BET) surface area of the pyrogenically produced lithium titanate or pyrogenically produced lithium aluminate is 10 m$^2$/g-200 m$^2$/g.

4. The process according to claim 1, wherein the lithium titanate is employed and a mean particle diameter $d_{50}$ of particles of the pyrogenically produced lithium titanate is 10 nm-200 nm, as determined by static light scattering (SLS) after 60 s of ultrasonic treatment at 25° C. of a 5% by weight dispersion of the particles in water.

5. The process according to claim 1, wherein the lithium aluminate is employed and a mean particle diameter $d_{50}$ of particles of the pyrogenically produced lithium aluminate is less than 20 μm, as determined by static light scattering (SLS) after 60 s of ultrasonic treatment at 25° C. of a 5% by weight dispersion of the particles in water.

6. The process according to claim 1, further comprising: thermally treating the coated transition metal oxide at a temperature of 500° C.-1,400° C.

7. The process according to claim 1, wherein the pyrogenically produced lithium aluminate is employed and is a compound of the formula $LiAlO_2$.

8. The process according to claim 1, wherein the transition metal oxide is selected from the group consisting of a cobalt oxide, a manganese oxide, a mixed nickel-cobalt oxide, a mixed nickel-manganese-cobalt oxide, a mixed nickel-cobalt-aluminium oxide, a mixed nickel-manganese oxide, and a mixture thereof.

9. The process according to claim 1, wherein a proportion of the pyrogenically produced lithium titanate and/or the pyrogenically produced lithium aluminate used in the dry mixing is 0.1%-2% by weight, related to a total weight of a mixture of the transition metal oxide and the pyrogenically produced lithium titanate and/or the pyrogenically produced lithium aluminate.

10. The process according to claim 1, wherein the lithium titanate is employed and the pyrogenically produced lithium titanate is a compound of the formula $LiTiO_2$, $Li_2TiO_3$, $Li_2Ti_3O_7$, $Li_2TiO_4$, $Li_4Ti_5O_{12}$, or a mixture thereof.

11. A process for producing a coated transition metal oxide, the process comprising: dry mixing a transition metal oxide and a pyrogenically produced lithium titanate,
   wherein the dry mixing comprises dry mixing 0.05 to 2% by weight of the pyrogenically produced lithium titanate, wherein the percent by weight is relative to a total weight of a mixture of the transition metal oxide and the pyrogenically produced lithium titanate,
   with the transition metal oxide,
   to thereby produce the coated transition metal oxide.

12. A process for producing a coated transition metal oxide, the process comprising: dry mixing a transition metal oxide and a pyrogenically produced lithium aluminate,
 wherein the dry mixing comprises dry mixing 0.05 to 2% by weight of the pyrogenically produced lithium aluminate, wherein the % by weight is relative to a total weight of a mixture of the transition metal oxide and the pyrogenically produced lithium aluminate,
 with the transition metal oxide,
 to thereby produce the coated transition metal oxide.

13. The process according to claim 1, wherein the transition metal oxide a mixed nickel-manganese-cobalt oxide.

14. The process according to claim 11, wherein the transition metal oxide a mixed nickel-manganese-cobalt oxide.

* * * * *